(12) United States Patent
Mélange

(10) Patent No.: US 10,310,875 B2
(45) Date of Patent: Jun. 4, 2019

(54) DEVICE FOR AUDIO INPUT/OUTPUT

(71) Applicant: TELEVIC CONFERENCE NV, Izegem (BE)

(72) Inventor: Cedric Mélange, Beveren (BE)

(73) Assignee: TELEVIC CONFERENCE NV, Izegem (BE)

( * ) Notice: Subject to any disclaimer, the term of this patent is extended or adjusted under 35 U.S.C. 154(b) by 0 days.

(21) Appl. No.: 15/520,006

(22) PCT Filed: Oct. 16, 2015

(86) PCT No.: PCT/EP2015/074071
§ 371 (c)(1),
(2) Date: Apr. 18, 2017

(87) PCT Pub. No.: WO2016/062641
PCT Pub. Date: Apr. 28, 2016

(65) Prior Publication Data
US 2017/0322819 A1    Nov. 9, 2017

(30) Foreign Application Priority Data
Oct. 19, 2014    (BE) .................................. 2014/5016

(51) Int. Cl.
*G01L 21/00*    (2006.01)
*G06F 9/451*    (2018.01)
(Continued)

(52) U.S. Cl.
CPC .............. *G06F 9/454* (2018.02); *G06F 3/048* (2013.01); *G06Q 10/1095* (2013.01);
(Continued)

(58) Field of Classification Search
USPC ........... 704/1–10, 230–257, 270, 270.1, 277
See application file for complete search history.

(56) References Cited

U.S. PATENT DOCUMENTS 9,031,827 B2 * 5/2015 Frankel ................. H04M 3/568
379/202.01
2009/0089042 A1    4/2009 Wald et al.
(Continued)

FOREIGN PATENT DOCUMENTS

JP         2006268561 A    10/2006
WO    WO 2011/055170    *   5/2011

OTHER PUBLICATIONS

Belgium Search Report for corresponding Belgium Application No. 2014/5016, dated Jul. 28, 2015.
(Continued)

*Primary Examiner* — Huyen X Vo
(74) *Attorney, Agent, or Firm* — Workman Nydegger

(57) ABSTRACT

An interpreter desk for a conferencing system is presented comprising a first interface configured to select an audio input channel from a plurality of audio input channels. Each corresponding to a different language, from which selected audio input channel a translation into a target language is to be performed. A processing unit is arranged to suggest one or more audio input channels and corresponding language as a source language for translation into the target language, based on at least one user preference and an indication of the quality of the different languages.

19 Claims, 2 Drawing Sheets

(51) Int. Cl.
*H04M 3/56* (2006.01)
*G06F 3/048* (2013.01)
*G06Q 10/10* (2012.01)
*H04L 12/18* (2006.01)

(52) U.S. Cl.
CPC ........ *H04L 12/1822* (2013.01); *H04M 3/563* (2013.01); *H04M 3/566* (2013.01); *H04M 2203/2061* (2013.01)

(56) References Cited

U.S. PATENT DOCUMENTS

| | | | |
|---|---|---|---|
| 2010/0135478 A1* | 6/2010 | Wald | G06F 17/289 |
| | | | 379/202.01 |
| 2014/0019113 A1* | 1/2014 | Wu | G06F 17/2735 |
| | | | 704/2 |
| 2014/0156254 A1 | 6/2014 | Frankel et al. | |
| 2014/0205116 A1* | 7/2014 | Smith | H04R 3/005 |
| | | | 381/122 |
| 2014/0236566 A1* | 8/2014 | Schreier | G06Q 10/105 |
| | | | 704/2 |

OTHER PUBLICATIONS

International Search Report for corresponding International PCT Application No. PCT/EP2015/074071, dated Jan. 15, 2016.
"SL Interpreter, Compact Interpreter Console," Sennheiser, URL: http://en-de.sennheiser.com/global-downloads/file/2181/SL_Interpreter_SpecSheet.pdf, Retrieved: Jul. 6, 2015, pp. 1-4.

* cited by examiner

DEVICE FOR AUDIO INPUT/OUTPUT

FIELD OF THE INVENTION

The present invention is generally related to the field of interpreting equipment for use in digital conferencing systems.

BACKGROUND OF THE INVENTION

A conferencing system comprises a central unit, connected with several delegate units for the participating delegates. The central unit serves to combine audio channels of various delegate units and to distribute the received audio and data channel and combinations of these channels.

A team of interpreters provides translation for the conference participants. This typically takes the form of simultaneous interpretation. Interpreters usually have a so-called 'interpreter desk' to assist them in performing their work. This unit provides an interface that allows the interpreter to select the incoming language of their choice as well as the language into which they will be interpreting. The language out of which the interpreter interprets is referred to as the 'relay language'. For this purpose, the interpreter desk includes a number of relay buttons, often equipped with an LED indicator. These buttons can be easily programmed when going through the list of available languages. The interpreter desk contains a display, for example an LCD display, on which relevant information can be shown (for example, quality of the relay languages, output channels or other additional information).

A special input channel is the floor channel of the conferencing system, i.e., the language that is being spoken on the conference floor at that moment. If this is a language that the interpreter does not master, the interpreter will be unable to directly use the floor channel signal. The interpreter then has to rely on a translation of the language of the floor channel. In addition to, for example, an indication of the incoming languages, a relevant part of information for the interpreter may contain an indication of the translation quality. This is usually done using a qualifier, such as, +, ++, +++ or FL, −1, −2; where 'FL' stands for 'floor language', i.e., the language that is being spoken on the conference floor at that moment. In this way, it is possible for interpreters to distinguish between direct and indirect translation and indirect translations can easily be avoided as much as possible.

The present invention more specifically relates to the selection of the relay channel, i.e. the channel out of which the interpreter will be translating. In an interpreter desk in accordance with the prior art, this is done by means of an interface to a number of relay channels (typically ranging between five and seven channels), which are configurable via programming by an operator or by the interpreter him or herself.

In JP2006/268561 a system is described for interpreter management. It includes a web server, an application server suitable for interpreting activities, a mail server for transmission/reception of an email, a multimedia server, an information terminal of a user of the system, an information terminal of an interpreter, an information terminal in a business to which the user belongs, an information terminal in an interpreting company to which the interpreter belongs and an information terminal in a company that handles the management of the system. The respective system components are connected via a communication network.

US2009/089042 discusses a computer system with one or more interfaces that allow communication with one or more communication devices. A first database is stored in a memory that links geographic regions with the most commonly spoken language or languages of those regions. A second database links interpreters with different languages and a third database includes demographic data of persons who previously registered with the service and includes, for example, telephone numbers and languages spoken. When a request is received, the computer system checks in the third database which languages the requestor masters, determines a geographic region linked to the relevant communication device and a language of that region as indicated in the first database. By means of the second database, an appropriate interpreter is chosen who speaks both the language of the region and one of the languages spoken by the participant.

In US2014/156254 a solution for conducting a conference between a multitude of geographically dispersed participants whereby simultaneous interpretation in a plurality of languages and automatic floor control is applied, is presented. An audio bridge is established for each of the languages. Each participant connects to a bridge through a network based upon a preferred language. The interpreter is connected to a first and second bridge, whereby the interpreter listens via a first bridge and speaks a translation in the second channel. The audio connections are configured automatically according to the language being spoken and the abilities of the interpreters.

There is therefore a need for an improved interpreter desk that offers the possibility to automatically choose the language which needs to be interpreted.

SUMMARY OF THE INVENTION

It is an object of embodiments of the present invention to provide for an improved interpreter desk that offers the possibility of selecting the language that needs to be interpreted in an automatic manner, taking into account at least the interpreter's preferences.

The above objective is accomplished by a method and processing unit for a target arrangement according to the present invention.

In a first aspect the invention relates to an interpreter desk for a conferencing system comprising a first interface configured to select an audio input channel from a plurality of audio input channels, each corresponding to a different language, from which selected audio input channel a translation into a target language is to be performed, the first interface being configurable, a second interface, configured to select an audio output channel to transmit the translation to a conference participant, characterised in that the interpreter desk includes a processing unit arranged to suggest one or more audio input channels and the corresponding languages as source language for translation into the target language, based on at least one user preference and an indication of the quality of the different languages.

The proposed method is mainly characterised in that the options suggested to the interpreter are based not only on an indication of the quality of the language offered (i.e. how often the original language has already been translated in order to arrive at the translation offered), but also takes into account the preferences of the interpreter, i.e. the language or languages out of which he or she prefers to interpret.

In a preferred embodiment the suggestion of one or more audio input channels is further based on the audio quality of the audio input channels.

In an advantageous embodiment the processing unit is equipped to display the original language of a language corresponding to an audio input channel of the plurality of audio channels. In this way, the interpreter can see what language was started from, in order to arrive at the language that corresponds to the appropriate audio input channel.

In another embodiment one of the audio-input channels is the floor channel of the conference system.

Preferably, the suggested one or more audio input channels are further based on information about which interpreters are active in an interpreter session.

In another aspect the invention relates to a method for carrying out an interpreter session, including receiving in an interpreter desk a plurality of audio-input channels, each corresponding to a different language, determining in a processing unit of the interpreter desk of one or more audio input channels and the corresponding languages from the plurality, in order to suggest these one or more audio input channels to the interpreter as a source for translation into the target language, based on at least one user preference and an indication of the quality of the different languages, selecting, from the suggested audio input channels, an audio input channel and its corresponding language out of which a translation is performed into a target language, transmitting said translation to a conference participant via an audio output channel of said interpreter desk.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
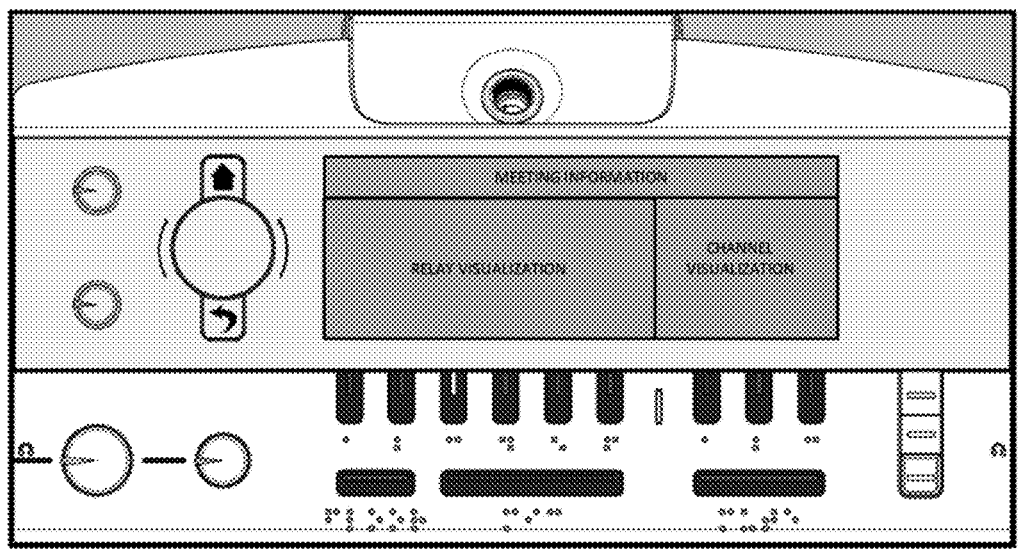
FIG. 1 illustrates a complete implementation of an interpreter desk interface (display, buttons).

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention proposes an interpreter desk for use in a digital conferencing system. Such a desk allows interpreters to perform their simultaneous interpreting in a more comfortable manner during an audio/video conference.

In the proposed solution a set of possible languages is chosen algorithmically from all possible audio input channels of the interpreter desk to offer to the interpreter, in a processing unit of the interpreter desk.

The algorithm takes into account at least the preferences of the interpreter with regard to the languages out of which he or she must translate. Preferably, account will also be taken of which interpreters are actively interpreting in a session at a given moment. On this basis, a number of languages that offer the highest degree of quality are suggested to the interpreter. That is, those languages are suggested that have undergone the least number of successive translations. After all, as already indicated in the introduction, it may happen that an interpreter does not master the language spoken on the conference floor, and has to rely on a translation from the floor language into another language. There may even be several intermediate steps, which may result in an additional loss of quality each time.

In an embodiment the algorithm also takes into account the quality of the received audio signals. In this way, for example, a signal in an appropriate language, e.g., which is nevertheless greatly disturbed by a technical fault, can still be set aside. Only signals of sufficient quality (expressed e.g. in a sufficiently high signal-to-noise ratio) can thus be considered as a possible language to select from.

Figure 2:
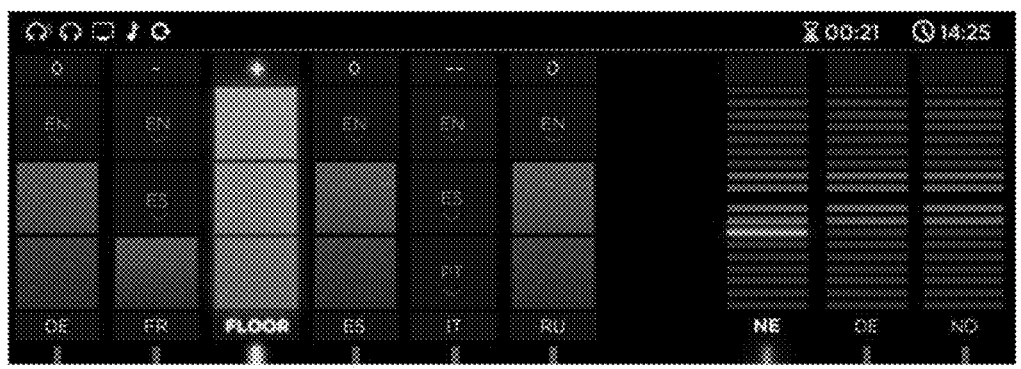
FIG. 2 illustrates quality indicators for relays and channels.

FIG. 2 illustrates a case where the interpreter has to translate from the floor language into Italian (ITA), via Spanish and Portuguese. In principle, an interpreter will not directly select the relay corresponding to Italian, but would rather choose a language which is translated more directly from the floor language (e.g. German, translated directly from the floor language).

As a further improvement, this invention proposes an interpreter desk, where a clear graphic image can be shown on the display screen of the way in which the different successive languages have been translated, starting from the floor language and finally arriving at the relay language. This is also clearly illustrated in FIG. 2, in which the bars and the intermediate language not only show how the relay language has been formed, but also an immediate indication is given of the quality of the translation through symbols (e.g. −, +, 0, etc.).

In this way, the interpreter him or herself may choose the best predefined relay or best relay channel suggested by the interpreter equipment.

This is also illustrated in FIG. 2. The best relay channel is clearly relay 3, the direct floor channel, but the algorithm also indicates that for this particular interpreter, who would prefer not to translate out of English, another channel such as German is better suited. The interpreter has entered these preferences at the start of the session through a number of configuration menus.

Figure 3:
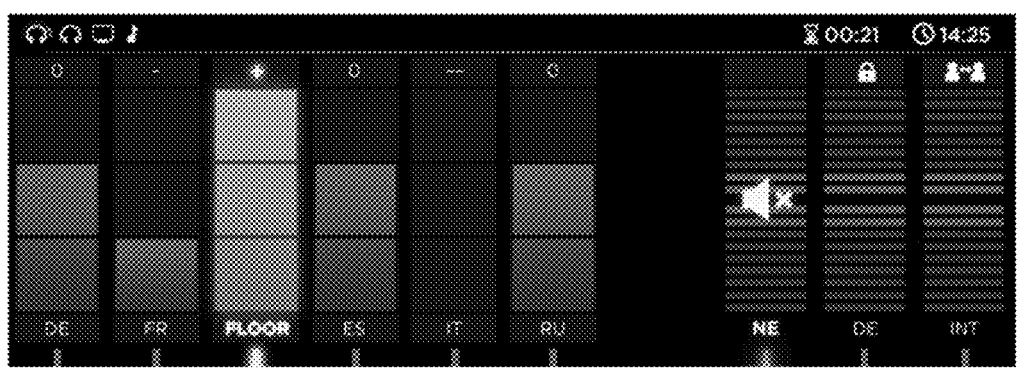
FIG. 3 illustrates a possibility of additional information (e.g. channel muted).
Figure 4:
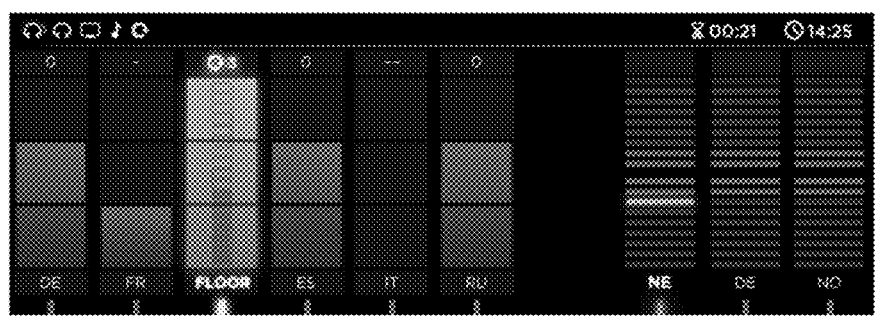
FIG. 4 illustrates the possibility of additional information (e.g. rewind function).

In addition to the above-mentioned aspects of the interpreter desk, such as the graphic display of the most suitable relay channel, a number of other improvements are also possible through the use of a graphic display. This is for example illustrated in FIG. 3 (indicating that an output channel is set to 'mute') or in FIG. 4, which (in the context of the 'rewind function') indicates when the inbound channel is once again in sync with the meeting. The rewind function is a function that allows an interpreter to accelerate playback of a specific portion of the meeting (e.g. if the interpreter misheard what was said).

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An interpreter desk device configured for a conferencing system in which content is translated from an original language to a target language, the interpreter desk device comprising:
   a first interface configured to select an audio input channel from a plurality of audio input channels, each of said plurality of audio input channels corresponding to a different language, from which a selected audio input channel is selected for which a translation into the target language is to be performed,
   a second interface configured to select an audio output channel to send out said translation to a conference participant, and
   a hardware processing unit that suggests one or more of said audio input channels and the corresponding language as a source language for translation into said target language,
   wherein
   the hardware processing unit suggests the one or more audio input channels and the corresponding language as the source language for translation into said target language based at least in part on at least one user preference, and
   the hardware processing unit suggests the one or more audio input channels and the corresponding language as the source language for translation into said target language further based at least in part on an indication of how many translations of said content said different languages have undergone from the original language.

2. The interpreter desk device for a conferencing system as in claim 1, wherein the hardware processing unit suggests the one or more audio input channels and the corresponding language as the source language for translation into said target language further based at least in part on the audio quality of said audio input channels.

3. The interpreter desk device according to claim 2, wherein the hardware processing unit suggests the one or more audio input channels and the corresponding language as the source language for translation into said target language based at least in part on the audio quality having a high signal-to-noise ratio at least above a predetermined threshold.

4. The interpreter desk device for a conferencing system as in claim 1, wherein said processing unit is arranged to display the original language of a language corresponding to an audio input channel of said plurality of audio channels.

5. The interpreter desk device for a conferencing system as in claim 1, wherein one of said audio input channels is the floor channel of the conferencing system.

6. The interpreter desk device for a conferencing system as in claim 1, wherein the hardware processing unit suggests the one or more audio input channels and the corresponding language as the source language for translation into said target language further based at least in part on information about which interpreters are active in an interpreter session.

7. The interpreter desk device according to claim 1, wherein the hardware processing unit suggests the one or more audio input channels and the corresponding language as the source language for translation into said target language further based on each of
audio quality of said audio input channels, and
information about which interpreters are active in an interpreter session.

8. The interpreter desk device according to claim 1, wherein the at least one user preference includes a preference of the different language of the plurality of audio input channels out of which the user prefers to interpret.

9. The interpreter desk device according to claim 1, wherein the hardware processing unit suggests the different language that has undergone the least number of successive translations as the one or more audio input channels and the corresponding language as the source language of the different languages of the plurality of audio input channels.

10. The interpreter desk device according to claim 1, wherein the interpreter desk device further comprises a display device that graphically displays the successive translations from the original language said different languages have undergone.

11. The interpreter desk device according to claim 1, wherein the interpreter desk device further comprises a display device that graphically displays an indication of the quality of the successive translations from the original language said different languages have undergone.

12. The interpreter desk device according to claim 1, wherein the interpreter desk device further comprises an input device configured to receive input from a user indicating the at least one user preference and the interpreter desk device further comprises a memory device configured to store the at least one user preference.

13. The interpreter desk device according to claim 1, wherein the interpreter desk device further comprises a display device that graphically displays the suggested one or more audio input channels and the corresponding language as the source language for translation into said target language.

14. A method for carrying out an interpreter session using an interpreter desk device configured for a conference system in which content is translated from an original language to a target language, the method comprising:
receiving in the interpreter desk, a plurality of audio-input channels, each corresponding to a different language,
determining, in a hardware processing unit of said interpreter desk, one or more audio input channels and the corresponding languages from said plurality of audio-input channels,
suggesting said one or more audio input channels and the corresponding languages to the interpreter as a source language for translation into said target language, based at least in part on at least one user preference and further based at least in part on an indication of how many translations of said content the different languages have undergone from the original language,
selecting, from the suggested audio input channels, an audio input channel and its corresponding language out of which a translation is performed into said target language, and
sending said translation to a conference participant via an audio output channel of said interpreter desk.

15. The method according to claim 14, wherein said suggesting one or more audio input channels is further based on the audio quality of said audio input channels.

16. The method according to claim 14, wherein said processing unit causes display of the original language of a language corresponding to an audio input channel of said plurality of audio channels.

17. The method according to claim 14, wherein one of said audio input channels is the floor channel of the conferencing system.

18. The method according to claim 14, wherein said suggesting one or more audio input channels is further based on information about which interpreters are active in an interpreter session.

19. A conferencing system for translation from an original language to a target language, the conferencing system comprising at least one interpreter desk device,
wherein the interpreter desk device includes
a first interface configured to select an audio input channel from a plurality of audio input channels of the conferencing system, each of said plurality of audio input channels corresponding to a different language, from which a selected audio input channel is selected for which a translation into a target language is to be performed,
a second interface configured to select an audio output channel to send out said translation to a conference participant within said system, and
a hardware processing unit that suggests one or more audio input channels and corresponding language as a source language for translation into said target language,
wherein
the hardware processing unit suggests the one or more audio input channels and the corresponding language as the source language for translation into said target language based in part on at least one user preference, and
the hardware processing unit suggests the one or more audio input channels and the corresponding language as the source language for translation into said target language further based at least in part on an indication of how many translations of said content said different languages have undergone from the original language.

\* \* \* \* \*